(12) United States Patent
Quast et al.

(10) Patent No.: US 10,399,464 B2
(45) Date of Patent: Sep. 3, 2019

(54) COVER FOR A RAIL PAIR OF A LONGITUDINALLY ADJUSTABLE VEHICLE SEAT AND RAIL PAIR

(71) Applicant: Adient Luxembourg Holding S.à. r. l., Luxembourg (LU)

(72) Inventors: Ingo Quast, Düsseldorf (DE); Erik Sprenger, Wermelskirchen (DE)

(73) Assignee: Adient Luxembourg Holding S.à. r. l., Luxembourg (LU)

( * ) Notice: Subject to any disclaimer, the term of this patent is extended or adjusted under 35 U.S.C. 154(b) by 0 days.

(21) Appl. No.: 15/535,862

(22) PCT Filed: Dec. 4, 2015

(86) PCT No.: PCT/EP2015/078703
§ 371 (c)(1),
(2) Date: Jun. 14, 2017

(87) PCT Pub. No.: WO2016/096486
PCT Pub. Date: Jun. 23, 2016

(65) Prior Publication Data
US 2017/0341531 A1 Nov. 30, 2017

(30) Foreign Application Priority Data
Dec. 16, 2014 (DE) .................. 10 2014 226 057

(51) Int. Cl.
*B60N 2/07* (2006.01)
(52) U.S. Cl.
CPC ........... *B60N 2/0725* (2013.01); *B60N 2/073* (2013.01); *B60N 2/0727* (2013.01)

(58) Field of Classification Search
CPC .... B60N 2/0725; B60N 2/0727; B60N 2/073; B60N 2/0722
USPC ......................................................... 248/429
See application file for complete search history.

(56) References Cited

U.S. PATENT DOCUMENTS

| 3,759,587 | A | * | 9/1973 | Christin | ................. | B60N 2/073 |
| | | | | | | 384/47 |
| 3,944,302 | A | * | 3/1976 | Fourrey | ............... | A47B 88/487 |
| | | | | | | 384/47 |
| 4,776,551 | A | * | 10/1988 | Nishino | ............... | B60N 2/0705 |
| | | | | | | 248/429 |
| 5,961,089 | A | * | 10/1999 | Soisnard | .............. | B60N 2/0705 |
| | | | | | | 248/430 |
| 2004/0206878 | A1 | * | 10/2004 | Borbe | .................. | B60N 2/0232 |
| | | | | | | 248/424 |
| 2010/0090083 | A1 | * | 4/2010 | Kojima | ................ | B60N 2/0725 |
| | | | | | | 248/429 |

(Continued)

FOREIGN PATENT DOCUMENTS

EP 2 174 827 A2 4/2010
JP H09 2109 A 1/1997

*Primary Examiner* — Christopher Garft
(74) *Attorney, Agent, or Firm* — McGlew and Tuttle, P.C.

(57) ABSTRACT

A cover (11), for a rail pair (3) of a longitudinally adjustable vehicle seat (1), includes at least one bottom rail (5) affixed to the vehicle and one top rail (7) which top rail (7) is longitudinally movable relative to the bottom rail (5). The cover (11) has a cover element (11.1) arranged and placed on at least one end (7.1, 7.2) of the rail pair (3) and an integrated stiffening element (11.2), designed to stiffen at least one of the two rails (5, 7), which protrudes into an interior chamber of the rail pair (3).

10 Claims, 5 Drawing Sheets

(56) References Cited

U.S. PATENT DOCUMENTS

2015/0210187 A1* 7/2015 Harleb ................ B60N 2/0232
                                                          248/429

* cited by examiner

COVER FOR A RAIL PAIR OF A LONGITUDINALLY ADJUSTABLE VEHICLE SEAT AND RAIL PAIR

CROSS REFERENCE TO RELATED APPLICATIONS

This application is a United States National Phase Application of International Application PCT/EP2015/078703, filed Dec. 4, 2015, and claims the benefit of priority under 35 U.S.C. § 119 of German Application 10 2014 226 057.4, filed Dec. 16, 2014, the entire contents of which are incorporated herein by reference.

FIELD OF THE INVENTION

The invention relates to a rail pair of a longitudinally adjustable vehicle seat, with the rail pair including at least one bottom rail and one top rail, which top rail is longitudinally movable relative to the bottom rail and a cover for a rail pair.

BACKGROUND OF THE INVENTION

Covers for rails of longitudinally movable vehicle seats are known from the prior art, wherein the covers prevent the penetration of foreign bodies into the rails and ensure a covering of sharp edges of the rails.

SUMMARY OF THE INVENTION

It is an object of the invention to provide a cover for a rail pair of a longitudinally movable vehicle seat which is improved relative to the prior art and an improved rail pair comprising such a cover.

With regard to the rail pair, which comprises at least one bottom rail and one top rail which is longitudinally movable relative to the bottom rail, the object according to the invention is achieved in that a stiffening element is arranged in the interior of the rail pair transversely to the longitudinal orientation.

The object is further achieved according to the invention by a cover for a rail of a longitudinally adjustable vehicle seat, wherein the cover comprises a cover element and an integrated stiffening element which is configured, in particular, for stiffening at least one of the rails. In this case, a cover element is able to be placed on at least one end of the rail pair, said cover element internally having a stiffening element which is able to be arranged in the interior of the rail pair transversely to the longitudinal orientation.

The advantages achieved by the invention, in particular, are that by the stiffening element arranged transversely to the longitudinal orientation in the interior of the rail pair and, in particular, by the cover having such an integrated stiffening element, the spring-back of the rail, for example the top rail, is minimized in a predetermined longitudinal adjustment position, wherein a deformation of the top rail and a resulting reduction in the gap between the side flanks of a bottom rail and the top rail is avoided. A greater displacement force in order to be able to displace the top rail relative to the bottom rail, due to the gap reduction, is thus not required in the predetermined longitudinal adjustment position. Moreover, it is possible for the top rail to have smaller dimensions, in particular a reduced material thickness.

In one possible embodiment, the stiffening element is configured as a slotted metal plate.

A further development provides that the stiffening element is configured as a tension bar or compression bar. In this case, for example when the rail profiles spring together, the stiffening element is subjected to a compressive or tensile load as a result of seat belt tension or an accident, so that the flanks of the rail profiles are subjected to less load and thus the gap between the rail profiles is maintained or only slightly altered.

In one possible embodiment, the stiffening element comprises a bar-shaped supporting member, at least two ends protruding therefrom vertically. In the inserted state of the stiffening element, the ends engage in recesses of the top rail and stiffen said top rail.

In one alternative embodiment, at least four integrally shaped portions protrude vertically from the bar-shaped supporting member. In the inserted state of the stiffening element, two of the integrally shaped portions, in particular the outer two, engage in recesses of the top rail and the other two integrally shaped portions, in particular the inner two, laterally support side flanks of the top rail. Thus the stiffening element permits a stiffening of the top rail in the transverse direction and at the same time permits a lateral support of the flanks of the top rail.

In a further embodiment of the cover, the cover element is of T-shaped configuration. In this case, in particular, the end of the rail pair is able to be covered almost completely, so that at least a penetration of foreign bodies and dirt particles is avoided.

In one development of the cover, the cover element and the stiffening element are arranged and held by a force-fit and/or form-fit on the top rail. In this case, the cover and the stiffening element are arranged on the top rail such that the top rail is stiffened in the transverse direction and at the same time a longitudinal mobility of the top rail is permitted.

One possible embodiment of the cover provides that the stiffening element is arranged on an inner face of the cover element. For example, the stiffening element is configured on an inner face of a base of the cover element, to protrude therefrom facing inwardly into the rail interior and to engage in the top rail. This position of the stiffening element permits a mechanical strength relative to loads during the longitudinal adjustment.

A further embodiment of the cover provides that the stiffening element supports and optionally encompasses side flanks of the top rail on the inner face and/or on the outer face. Moreover, the stiffening element comprises a supporting member extending in the transverse direction, said supporting member comprising integrally shaped portions which protrude for fixing the side flanks. Thus the side flanks are supported in a simple manner in the transverse direction. In particular, the side flanks of the top rail may be supported relative to deformations and compression of the top rail and bottom rail.

In one possible embodiment of the cover, the cover element and the stiffening element are connected together by a form-fit, force-fit and/or material bond. In a relatively simple and cost-effective manner, the stiffening element may be formed retrospectively on a conventional cover. Alternatively, the cover element and the stiffening element are configured from a molded component and thus in one piece. For example, the molded component is produced in an injection-molding method.

Moreover, the stiffening element may be formed from metal. The cover element may be formed from plastics.

A rail pair comprising such a cover is able to be mounted on a vehicle body, in particular in a simple manner. Additionally, at least the service life of the rails may be increased by deformations of the rails in the transverse direction being reduced by means of the cover.

In one development of the rail pair, the cover is arranged at least on a top rail by a form-fit and/or force-fit. Alternatively or additionally, the top rail comprises at least one recess corresponding to a stiffening element of the cover. In this case, the top rail is stiffened and stabilized during the longitudinal displacement relative to mechanical loads acting in the transverse direction. Additionally, the longitudinal mobility of the top rail relative to the bottom rail is permitted without restriction.

In particular, the cover may be arranged by a form-fit and/or force-fit on the front face of one of the rails. For example, the cover element is able to be placed on the front face of the end of the top rail and encompasses said top rail on the outer face.

Exemplary embodiments of the invention are described in more detail with reference to the drawings. The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
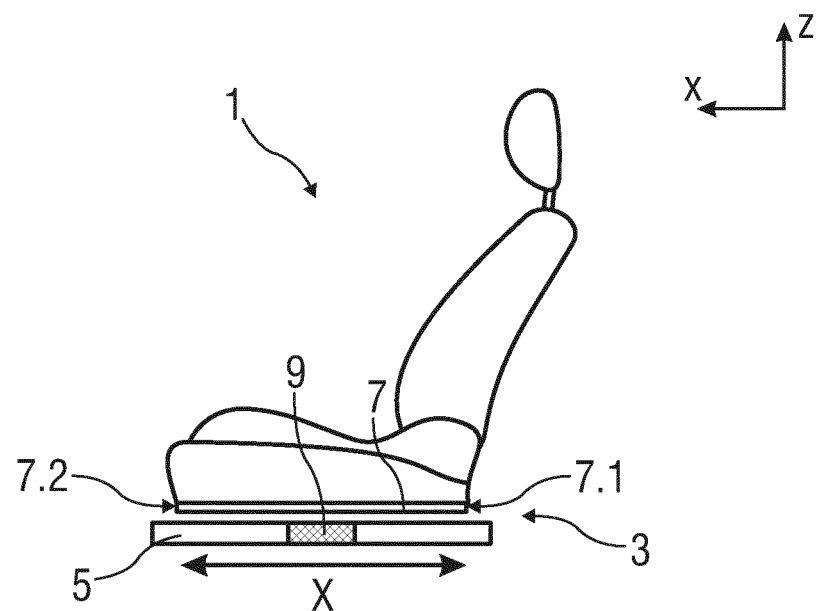
FIG. 1 is a schematic side view showing a vehicle seat comprising at least one rail pair.

Referring to the drawings, parts which correspond to one another are provided in all of the figures with the same reference numerals.

FIG. 1 shows in a side view one possible exemplary embodiment of a vehicle seat 1 comprising at least one rail pair 3.

An arrangement of the vehicle seat 1 in the vehicle in this case is defined using the coordinate system used hereinafter, comprising a vertical axis z assigned to a vertical direction of the vehicle, a longitudinal axis x assigned to a longitudinal direction of the vehicle and a transverse axis y assigned to a transverse direction of the vehicle.

The rail pair 3 is provided for the longitudinal mobility of the vehicle seat 1 and comprises a bottom rail 5 and a top rail 7 which is movable in the longitudinal direction relative to the bottom rail 5 and which is arranged on the vehicle seat 1.

The bottom rail 5 in this case is arranged fixed to the vehicle on a vehicle structure, for example on a vehicle floor, and in a predetermined region in the longitudinal direction has a bearing element 9 which bears the top rail 7.

The bearing element 9 is, for example, a ball cage comprising a plurality of balls, and which by means of the balls supports the top rail 7 and ensures the longitudinal mobility. The top rail 7 in this case is only supported in the region of the bearing element 9. In a longitudinal adjustment position, in which for example the vehicle seat 1 is positioned in a front end position in the longitudinal direction, a rear end 7.1 of the top rail 7 is arranged in the region of the bearing element 9, wherein a front end 7.2 of the top rail 7 has a defined spacing from the bearing element 9. Along this spacing, therefore, the top rail 7 is not supported by the bearing element 9.

Figure 2:
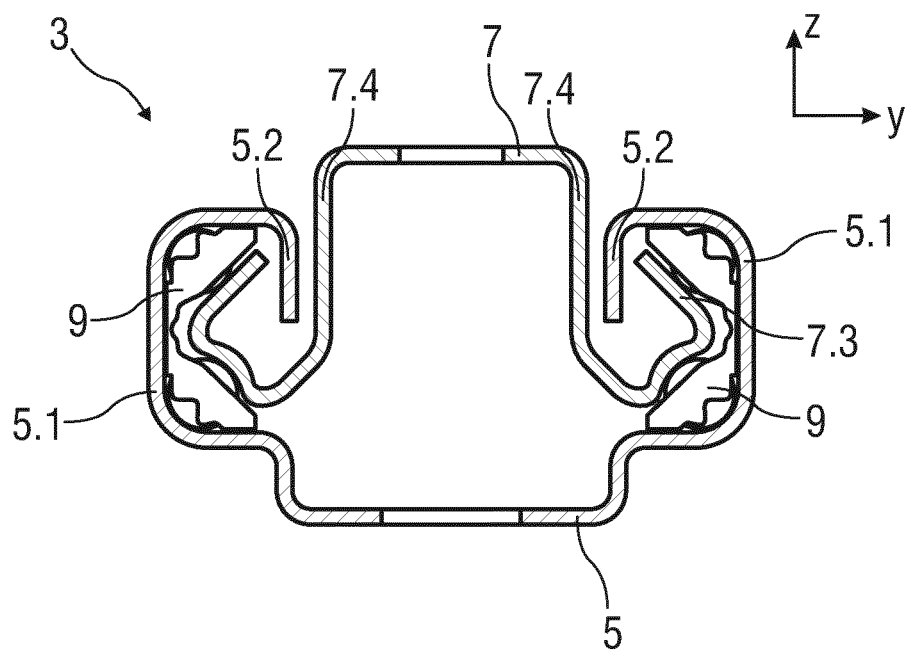
FIG. 2 is a schematic front view showing the rail pair.

FIG. 2 shows in a front view the rail pair 3 comprising the bottom rail 5, the top rail 7 and the bearing element 9.

The bottom rail 5 comprises four ball cages, or also denoted as roller cages, which are configured as bearing elements 9, the top rail 7 being mounted thereby in a longitudinally movable manner on four tracks or supports.

The bottom rail 5 and the top rail 7 mutually encompass one another with their substantially U-shaped profiles, with inwardly and/or outwardly bent longitudinal ends 5.1, 7.3 which have opposing, vertical side flanks 5.2, 7.4 which are arranged substantially parallel to one another.

The side flanks 5.2, 7.4 have before assembly an angular arrangement in opposing directions, i.e. the profiles are shaped at such angles that the side flanks 5.2, 7.4 are not arranged parallel to one another. During assembly, the longitudinal ends 5.1, 7.3 are pushed out over a contact region with the balls of the bearing element 9 so that the side flanks 5.2, 7.4 are oriented parallel with one another. Thus a displacement force of the top rail 7 is set via a defined pretensioning of the longitudinal ends 5.1, 7.3 on the bearing elements 9.

In disadvantageous longitudinal adjustment positions which are at a significant distance from the bearing element 9, a profile of the top rail 7 may flex outwardly and a profile of the bottom rail 5 may flex inwardly. As a result, this may lead to a minimizing of the gap in the region of the vertical side flanks 5.2, 7.4. This occurs, in particular, with long displacement paths or movement paths of the vehicle seat 1 and at the same time a short ball cage and may lead to undesirable noise, so-called touching.

In the event of a collision, in which the top rail 7 is pulled upwardly in the vertical direction, in the event of so-called seat belt tension, such a deformation behavior generally occurs that the side flanks 7.4 are forced inwardly.

Figure 3:
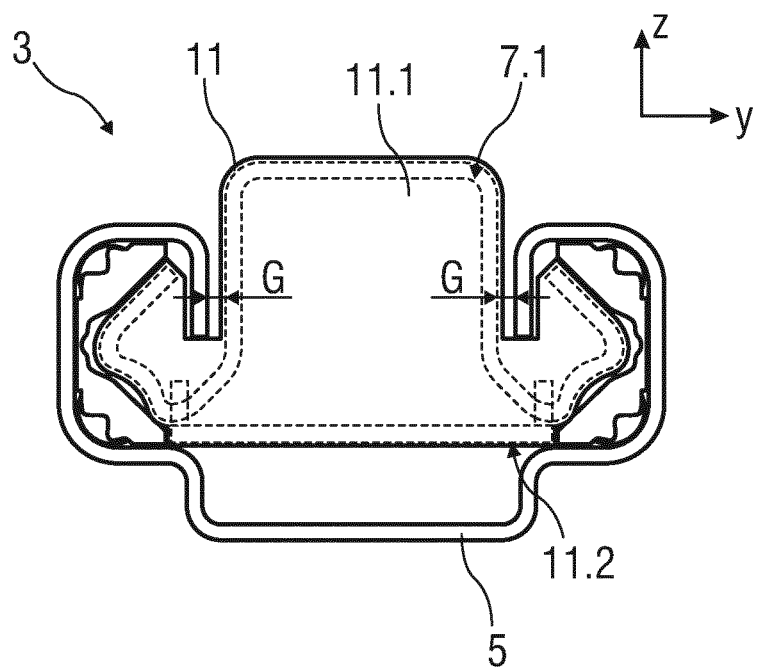
FIG. 3 is a schematic front view showing a rail pair with an exemplary embodiment of a cover.

FIG. 3 shows in a front view the rail pair 3 with an exemplary embodiment of a cover 11. The cover 11 is arranged and placed on the front face of the rail pair 3. In particular, the cover 11 is arranged on the top rail 7, in particular on the end 7.1 of the top rail 7.

The cover 11 is shown in a partially transparent view and in a very simplified manner, wherein said cover is configured, in particular, in one piece. The cover 11 comprises a cover element 11.1 which is provided to prevent the penetration of foreign bodies, for example dirt particles, into the top rail 7 and partially into the bottom rail 5.

The cover element 11.1 is substantially of T-shaped configuration so that the top rail 7 is almost completely covered. The cover element 11.1 is arranged by a force-fit and/or form-fit on the top rail 7. For example, the cover element 11.1 is able to be arranged by means of a latching connection on the top rail 7, such that with a movement of the top rail 7 relative to the bottom rail 5 the latching connection is not impaired.

In order to avoid a compression described in FIG. 2 of the side flanks 7.4 and a reduction in the gap G between the side flanks 7.4 and 5.2 of the rails 7 and/or 5, and to counteract undesirable noise development in the case of a movement of the vehicle seat 1, the cover 11 has an integrated stiffening element 11.2 which is configured for stiffening the top rail 7 and which protrudes into an interior of the rail pair 3. The stiffening element 11.2 is configured as a tension bar or compression bar. Moreover, the stiffening element 11.2. is arranged transversely to the longitudinal orientation X in the interior of the rail pair 3.

The cover element 11.1 is placed from outside onto the front face of the top rail 7.

Figure 7:
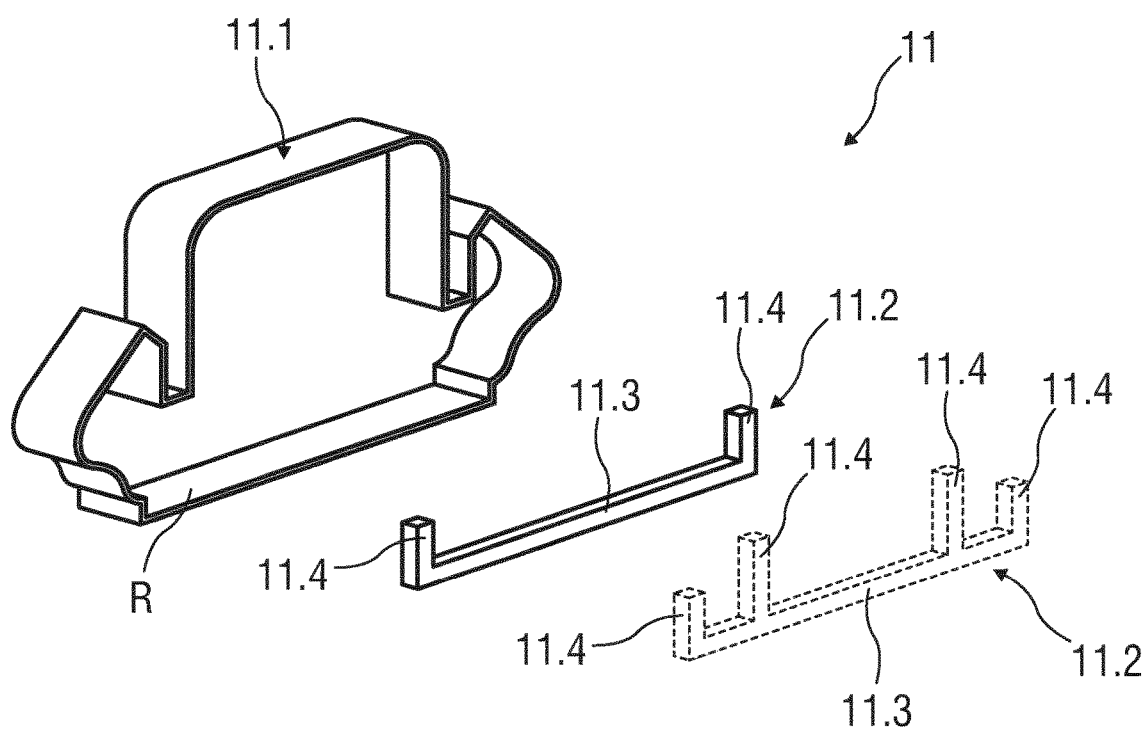
FIG. 7 is a schematic exploded view showing a cover and a stiffening element in different embodiments.

In this case the cover element 11.1 at least partially protrudes with a projecting edge R into the top rail 7 (as shown in FIG. 7).

In this case, the edge R of the cover element 11.1 is able to protrude at different distances into the top rail 7. For example, the lower edge R or the base of the cover element 11.1 protrudes below the rail base of the top rail 7, further therein than the upper or lateral edges R of the cover element 11.1. In the base region the cover element 11.1 has, in a manner not shown in more detail, receivers for the integrated stiffening element 11.2 which is retained in these receivers by a form-fit, material bond and/or force-fit. Alternatively, the stiffening element 11.2 and the cover element 11.1 may be a molded component, wherein the stiffening element 11.2 is shaped, in particular is shaped to protrude, on the inner face of the base of the cover element 11.1. In particular, the stiffening element 11.2 and the cover element 11.1 may be configured as a one-piece injection-molded component.

The stiffening element 11.2 is configured, for example, as an insert part made of a metal material and subsequently inserted into the cover element 11.1. To this end, the cover element 11.1, for example, has a plug-in part corresponding to the insert part. It is also possible that the insert part comprises latching elements which latch into latching holes of the cover element 11.1 corresponding thereto and permit a fastening of the stiffening element 11.2 on the cover element 11.1. The cover 11 in this case is of multipart configuration.

In order to counteract a displacement of the stiffening element 11.2 due to a collision, in particular a displacement in the vertical direction, the plug-in part or the latching elements for the stiffening element 11.2 is/are configured such that a fixing of the position thereof is ensured. For example, in the vertical direction the latching elements have a number of latching hooks which, when the stiffening element 11.2 is arranged, latch into the latching holes of the cover element 11.1 and hold the stiffening element 11.2 in a predetermined position.

In a further exemplary embodiment, the stiffening element 11.2 which is configured as a metal part has already been integrally formed on the cover element 11.1 during the original forming, for example in an injection-molding method, in particular a plastics used for producing the cover element 11.1 is injection-molded around the stiffening element 11.2, wherein the cover 11 is thus configured in one piece.

In a further exemplary embodiment, for example due to a high-strength material of the top rail 7, a spring force of the profile of the top rail 7 is low, such that the stiffening element 11.2 which is configured as a metal part is not required. In this case, it is possible that only the cover 11 is arranged on the top rail 7, wherein a load is able to be fully absorbed by the cover 11 configured as a plastics cap.

Figure 4:
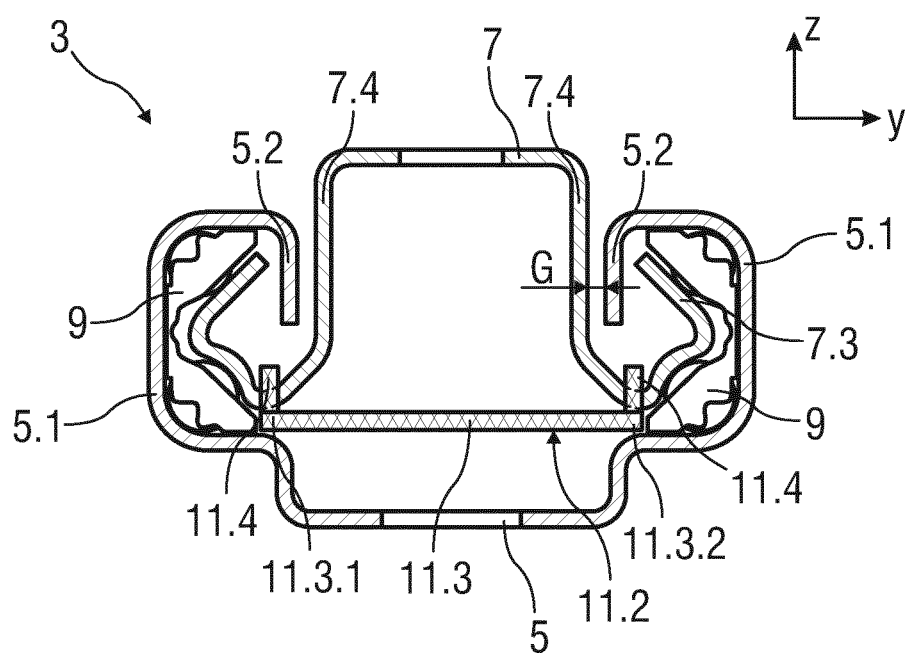
FIG. 4 is a schematic front view showing the cover shown in FIG. 3 without a cover element.

FIG. 4 shows in a front view the cover 11 shown in FIG. 3 without the cover element 11.1.

The stiffening element 11.2 in this case is arranged in recesses, not shown here, of the respective end 7.1, 7.2 of the top rail 7. To this end, the stiffening element 11.2 has a supporting member 11.3 extending in the transverse direction Y, which at its ends 11.3.1, 11.3.2 comprises at least two integrally shaped portions 11.4 or support elements corresponding to the recesses of the top rail 7 and substantially protruding from the supporting member 11.3. The integrally shaped portions 11.4 are, for example, configured to be pin-shaped or rib-shaped or stud-shaped. The recesses and/or the integrally shaped portions 11.4 in this case support the side flanks 7.4 of the top rail 7 from an outer face.

Since a tensile force is exerted on the supporting member 11.3, the stiffening element 11.2 is thus configured as a tension element, in particular a tension bar or brace and stiffens or stabilizes the top rail 7, in particular the ends 7.1, 7.2, such that the integrally shaped portions 11.4, in particular, counteract a force acting outwardly in the transverse direction. The outwardly acting force on the side flanks 7.4 is, for example, produced by a compression of the rails in the vertical direction (force or pressure from above onto the top rail 7). Alternatively, the stiffening element 11.2 may be configured as a compression bar.

Figure 5:
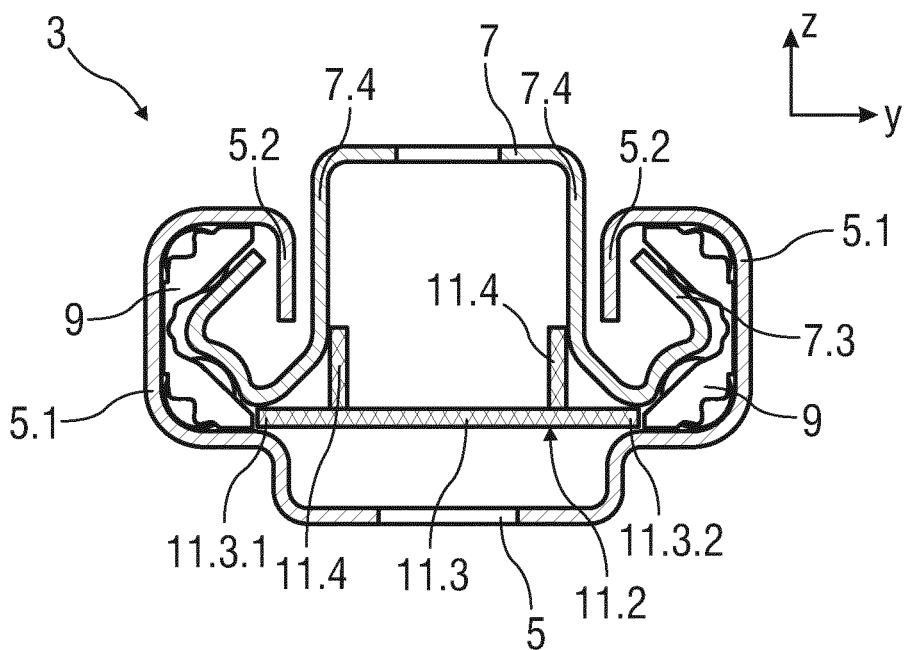
FIG. 5 is a schematic front view showing the rail pair, wherein a further exemplary embodiment of a stiffening element is arranged on the top rail.

FIG. 5 shows in a front view the rail pair 3, wherein a further exemplary embodiment of a stiffening element 11.2 is arranged on the top rail 7.

In contrast to the exemplary embodiment shown in FIGS. 3 and 4, the stiffening element 11.2 supports the side flanks 7.4 on the inner face. To this end, the recesses and/or the integrally shaped portions 11.4 have a smaller spacing relative to one another.

Due to the support of the inner faces of the side flanks 7.4, for example in the case of a collision, a compressive force is exerted via the integrally shaped portions 11.4 on the supporting member 11.3, so that the stiffening element 11.2 is configured as a compression element. By means of the engagement of the stiffening element 11.2 in the recesses of the top rail 7, said top rail is stiffened or stabilized, in particular the ends 7.1, 7.2 of the top rail 7, such that the integrally shaped portions 11.4 of the stiffening element 11.2 counteract a force acting inwardly in the transverse direction, in particular. The force acting inwardly, for example, is a peel force in which a stretching of the rails in the vertical direction is produced (=a so-called peel strength load), in which the force pulls the top rail 7 upwardly).

Figure 6:
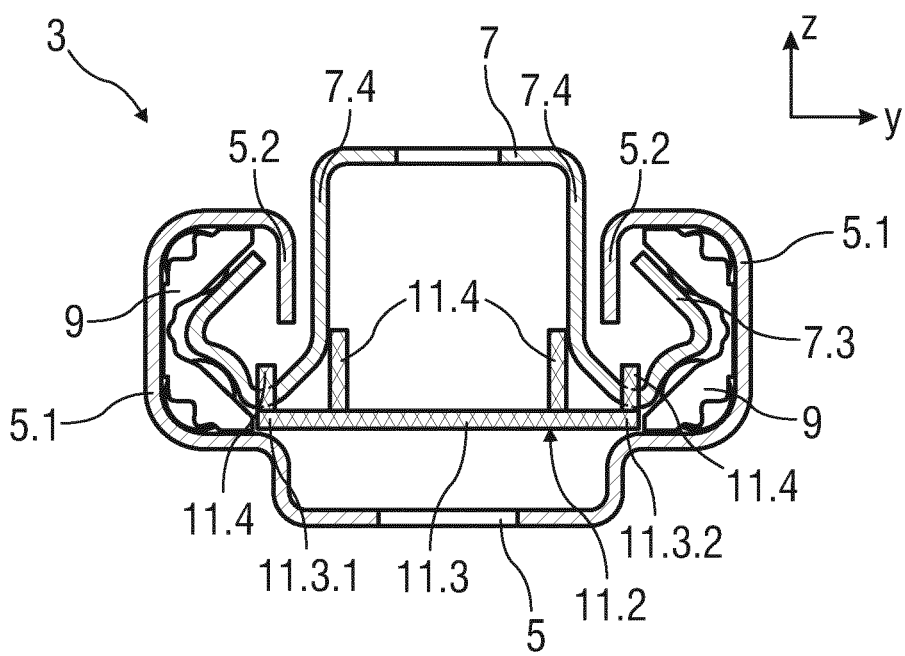
FIG. 6 is a schematic front view showing the rail pair, wherein a further exemplary embodiment of a stiffening element is arranged on the top rail.

FIG. 6 shows in a front view the rail pair 3, wherein a further exemplary embodiment of a stiffening element 11.2 which is arranged on the top rail 7 is shown.

In contrast to the exemplary embodiments shown in FIGS. 3 to 5, the stiffening element 11.2 in this case supports the side flanks 7.4 of the top rail 7 both from the inner face and from the outer face. To this end, the stiffening element 11.2 comprises four integrally shaped portions 11.4 which engage in recesses of the top rail 7 corresponding thereto. The outer recesses in the top rail 7 in this case are arranged in a bending region between the side flanks 7.4 and the longitudinal ends 7.3. The four integrally shaped portions 11.4 protrude by a predetermined length into the top rail 7.

Thus the reduction of the spring-back of the top rail 7 is not only possible at the respective ends 7.1, 7.2 but also within the top rail 7.

FIG. 7 shows schematically in an exploded view the cover 11 with the inwardly facing edge R and the stiffening element 11.2 in two different embodiments.

In this case, the integrally shaped portions 11.4 of the stiffening element 11.2 are configured to be of different lengths. In particular, the outer integrally shaped portions 11.4 which engage in recesses of the top rail 7 are configured to be shorter than the inner integrally shaped portions 11.4 which laterally support the side flanks 7.4 of the top rail 7.

Figure 8:
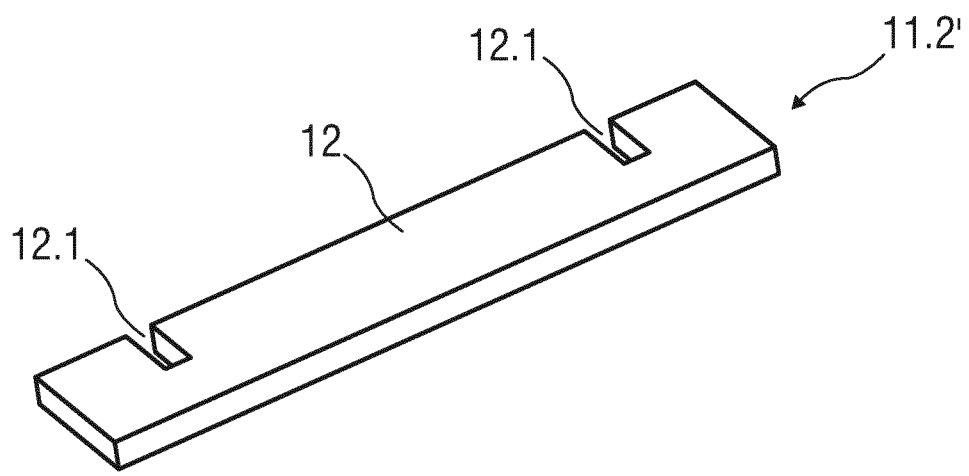
FIG. 8 is a schematic perspective view showing an alternative embodiment for a stiffening element.

FIG. 8 shows schematically in a perspective view a particularly simple embodiment for a stiffening element 11.2'. The stiffening element 11.2' is configured as a slotted shaped part 12 which has at least two slots 12.1.

The slotted shaped part 12 is produced, for example, from metal. Alternatively, it may be formed from plastics, in particular from a fiber-reinforced plastics.

Figure 9:
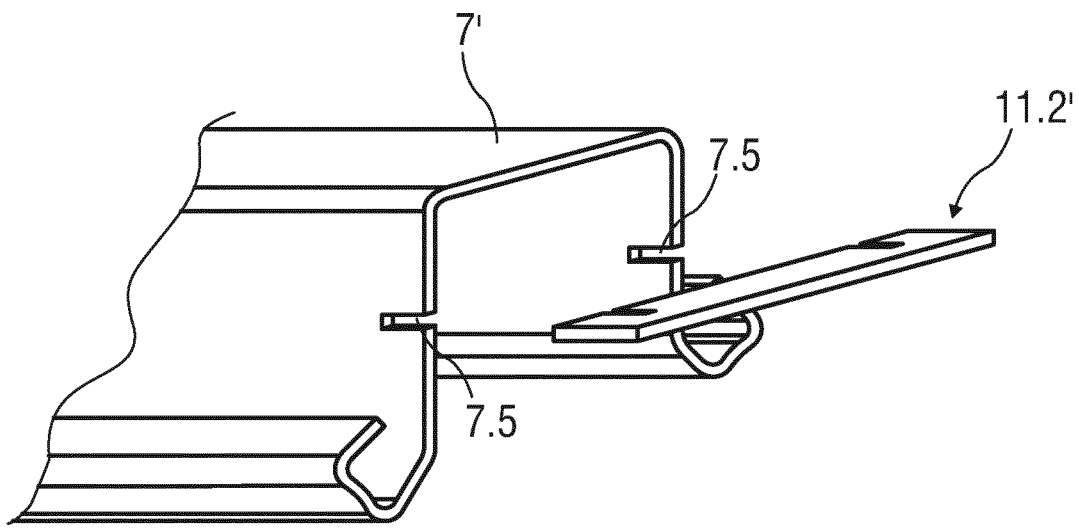
FIG. 9 is a schematic exploded view showing the stiffening element and the top rail.

FIG. 9 shows schematically in an exploded view the alternative stiffening element 11.2' and the associated and correspondingly configured top rail 7'. For receiving the alternative stiffening element 11.2', the top rail 7' has receiving slots 7.5 incorporated on the front face, the slots 12.1 of the shaped part 12 being able to be inserted therein. In other words, the shaped part 12 engages with the slots 12.1 in the receiving slots 7.5 of the top rail 7'.

Then the cover 11 on the front face is placed onto the shaped part 12 retained on the top rail 7', wherein the cover and shaped part are connected together by a form-fit and/or force-fit, for example via a frictional connection or force-fit or a latching connection.

While specific embodiments of the invention have been shown and described in detail to illustrate the application of the principles of the invention, it will be understood that the invention may be embodied otherwise without departing from such principles.

The invention claimed is:

1. A cover for a rail pair of a longitudinally adjustable vehicle seat, the rail pair comprising at least one bottom rail and at least one top rail which is longitudinally movable relative to the bottom rail, wherein the rail pair have an interior, the cover comprising:
    a cover element which is able to be placed on at least one end of the rail pair; and
    a stiffening element connected to or forming a part of the cover element and being arranged in the interior of the rail pair transversely to a longitudinal orientation of the rail pair, the stiffening element extending more in a transverse direction of the rail pair than in a longitudinal direction of the rail pair, wherein the cover element and the stiffening element are connected together by a form-fit, material bond and/or force-fit, the at least one top rail comprising a first top rail side flank, a second top rail side flank and a top rail portion, the first top rail side flank being connected to the second top rail side flank via the top rail portion, wherein a portion of the first top rail side flank and a portion of the second top rail side flank extend from the top rail portion in a downward direction, the stiffening element extending to a position beyond an outer surface of the portion of the second top rail side flank and to a position beyond an outer surface of the portion of the first top rail side flank.

2. The cover as claimed in claim 1, wherein the stiffening element is arranged on an inner face of the cover element.

3. The cover as claimed in claim 1, wherein the cover element and the stiffening element are configured in one piece.

4. The cover as claimed in claim 1, wherein the cover element and the stiffening element are configured as a molded component.

5. The cover as claimed in claim 1, wherein the stiffening element is formed from metal.

6. The cover as claimed in claim 1, wherein the cover element is formed from plastics.

7. The cover as claimed in claim 1, wherein the cover element is configured to be placed on a front face of an end of the top rail and encompasses the top rail on an outer face thereof.

8. The cover as claimed in claim 1, wherein the cover element and the stiffening element are configured as an injection-molded component.

9. The cover as claimed in claim 1, wherein the first top rail side flank is located opposite the second top rail side flank, wherein at least a portion of the first top rail side flank, at least a portion of the second top rail side flank and the top rail portion define an upper interior space of the at least one top rail, wherein a width of said stiffening element in the transverse direction is greater than a width of the upper interior space in the transverse direction.

10. A cover for a rail pair of a longitudinally adjustable vehicle seat, the rail pair comprising at least one bottom rail and at least one top rail which is longitudinally movable relative to the bottom rail, wherein the rail pair have an interior, the cover comprising:
    a cover element which is able to be placed on at least one end of the rail pair; and
    a stiffening element connected to or forming a part of the cover element and being arranged in the interior of the rail pair transversely to a longitudinal orientation of the rail pair, the stiffening element extending more in a transverse direction of the rail pair than in a longitudinal direction of the rail pair, the at least one top rail comprising a first top rail side flank, a second top rail side flank and a top rail portion, the first top rail side flank being connected to the second top rail side flank via the top rail portion, the first top rail side flank being located opposite the second top rail side flank, wherein at least a portion of the first top rail side flank, at least a portion of the second top rail side flank and the top rail portion define an upper interior space of the at least one top rail, wherein a width of said stiffening element in the transverse direction is greater than a width of the upper interior space in the transverse direction.

* * * * *